(12) United States Patent
Dela Rosa et al.

(10) Patent No.: US 6,993,239 B2
(45) Date of Patent: Jan. 31, 2006

(54) OPTICAL MODULES EMPLOYING GLASS-SEALED FIBER FEEDTHRU WITH C-SEAL

(75) Inventors: Herbert B. Dela Rosa, Fremont, CA (US); Giovanni Barbarossa, Saratoga, CA (US); William Z. Guan, Union City, CA (US); Weidong Zhu, Fremont, CA (US); Khanh T. Ly, San Jose, CA (US); Ching-Lin Chang, Milpitas, CA (US)

(73) Assignee: Avanex Corporation, Fremont, CA (US)

( * ) Notice: Subject to any disclaimer, the term of this patent is extended or adjusted under 35 U.S.C. 154(b) by 210 days.

(21) Appl. No.: 10/678,526

(22) Filed: Oct. 3, 2003

(65) Prior Publication Data
US 2005/0074219 A1 Apr. 7, 2005

(51) Int. Cl.
G02B 6/00 (2006.01)
G02B 6/36 (2006.01)

(52) U.S. Cl. .......................................... 385/138; 385/94
(58) Field of Classification Search ................. 385/138, 385/94, 88–93
See application file for complete search history.

(56) References Cited
U.S. PATENT DOCUMENTS

| | | | |
|---|---|---|---|
| 5,155,795 A | 10/1992 | Wasserman et al. | |
| 5,241,614 A | 8/1993 | Ecker et al. | |
| 5,810,048 A | 9/1998 | Zeiner-Gundersen | |
| 5,857,054 A | 1/1999 | Thomas et al. | |
| 6,115,528 A | * 9/2000 | Schmucker et al. | ........ 385/138 |
| 6,445,869 B1 | 9/2002 | Tanner | |
| 2002/0106168 A1 | 8/2002 | Kordahi et al. | |

FOREIGN PATENT DOCUMENTS

FR 2 696 242 4/1994

OTHER PUBLICATIONS

EP Search Report, Application No. 04023114.4, dated Jan. 12, 2005.

* cited by examiner

*Primary Examiner*—Frank G. Font
*Assistant Examiner*—Michael P. Mooney
(74) *Attorney, Agent, or Firm*—Patterson & Sheridan, LLP

(57) ABSTRACT

An optical module box made of aluminum that has a reworkable glass-sealed fiber feedthru is disclosed. A fiber is inserted through a glass seal and a C-seal for hermetically sealing an opening in the optical module box. In a first embodiment, a module box employing a single-fiber fiber feedthru is described. In a second embodiment, a module box employing a 2-fiber feedthru is described. In a third embodiment, a module box employing a ribbon fiber feedthru is described. A module box having an opening with a single-fiber feedthru, comprising a C-seal; a glass sealed feedthru having a front tube and a back tube, the back tube of the glass sealed feedthru extending through the C-seal; and a fiber passing through the glass sealed feedthru and the C-seal, thereby hermetically sealed into the opening of the module box.

14 Claims, 5 Drawing Sheets

GLASS-SEAL FIBER FEEDTHRU WITH C-SEAL

2-FIBER FEEDTHRU

OPTICAL MODULES EMPLOYING GLASS-SEALED FIBER FEEDTHRU WITH C-SEAL

BACKGROUND INFORMATION

1. Field of the Invention

The invention relates to the field of telecommunications, and more particularly to the assembly of optical modules.

2. Description of Related Art

Fiber optics transmission is a common platform for transporting voice, data, and images. As the demand for data carrying capacity continues to increase, optical companies are seeking techniques to utilize the bandwidth of existing fiber-optic cables more efficiently while enhancing the performance. Typically, the performance of optical devices is sensitive to its operational environment, such as humidity and pressure. Optical devices generally require a tight sealing package, i.e. hermetic sealing package, in order to prevent moisture or any other gas from passing through, ensuring a reliable performance during the life span of an optical module.

Conventionally, sealing techniques using epoxy and aluminum ferrule have been selected for implementing fiber feedthrus. Both of these solutions, however, are insufficient in their compliance to a more stringent sealing requirement. The higher stringent sealing requirement also makes an optical module more susceptible to sensitivities. Modernly, optical companies in the telecommunication industry that make optical modules are required to use a reliable sealing method which complies with the environmental reliability specifications in designing and manufacturing optical components and modules. The epoxy sealing technique is less flexible in that it is not reworkable. An epoxy-type material fills the pore in optical fiber holes and the optical package is baked at an elevated temperature until the epoxy dries. Once the epoxy dries, the optical module is therefore not reworkable.

Accordingly, it is desirable to have sealing techniques for optical modules that are less sensitive to meet a more stringent sealing requirement as well as making the optical module sealing reworkable.

SUMMARY OF THE INVENTION

The invention describes an optical module box made of aluminum that employs a glass-sealed fiber feedthru which is reworkable. A fiber is inserted through a glass seal and a C-seal for hermetically sealing an opening in the optical module box. In a first embodiment, a module box employing a single-fiber fiber feedthru is described. The second embodiment describes a module box that employs a 2-fiber feedthru. In a third embodiment, a module box employing a ribbon fiber feedthru is described.

A module box having an opening with a single-fiber feedthru, comprising a C-seal; a glass-sealed feedthru having a front tube and a back tube, the back tube of the glass-sealed feedthru extending through the C-seal; and a fiber passing through the glass-sealed feedthru and the C-seal, thereby hermetically sealing into the opening of the module box.

Advantageously, the present invention allows the module box to be reworkable by using a C-seal, which provides the flexibility for replacing a fiber connection when necessary.

Other structures and methods are disclosed in the detailed description below. This summary does not purport to define the invention. The invention is defined by the claims.

DETAILED DESCRIPTION OF PREFERRED EMBODIMENTS

Figure 1:
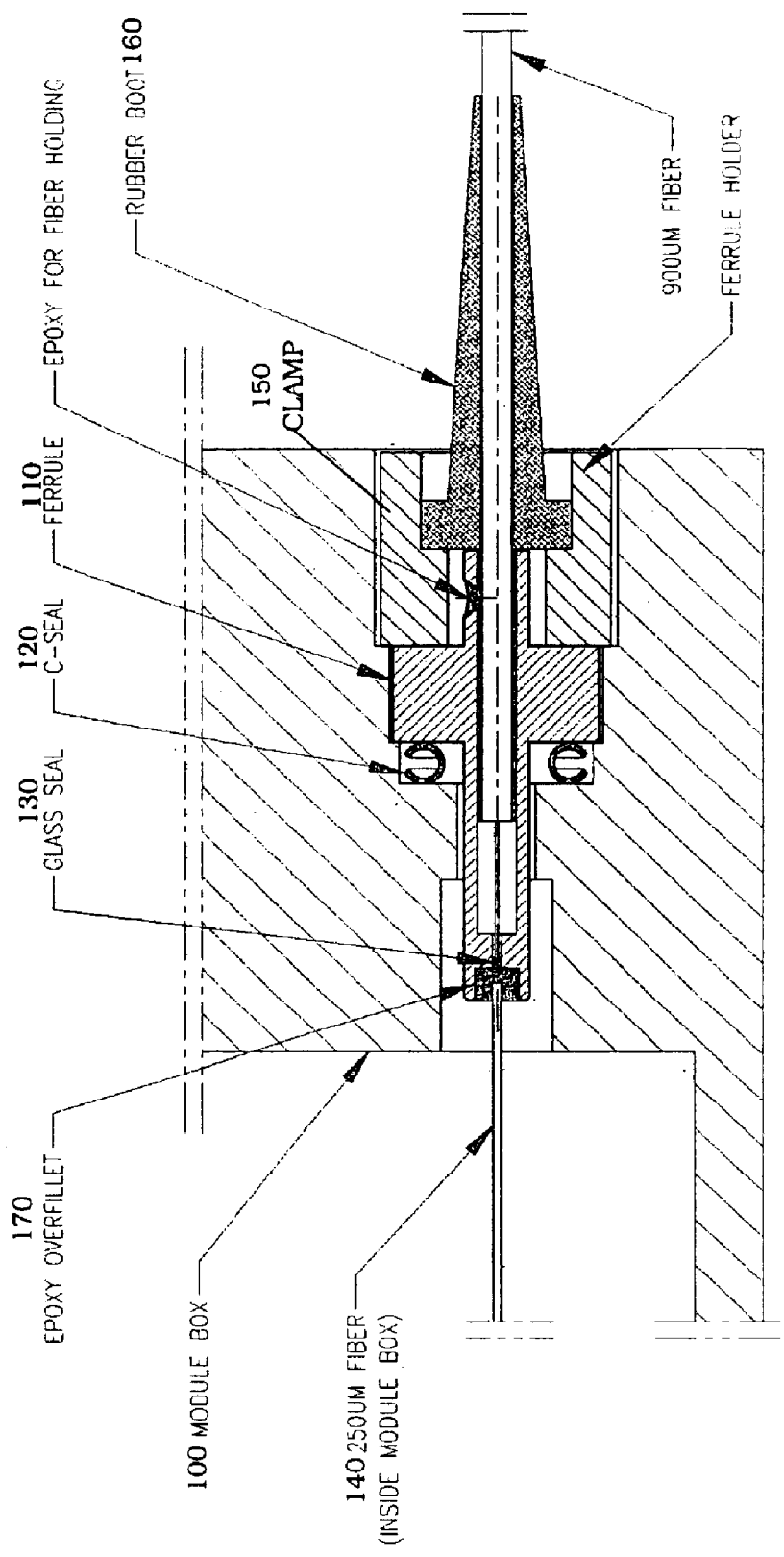
FIG. 1 is a pictorial diagram illustrating a cross-sectional view of a module box employing a reworkable glass-seal fiber feedthru with a C-seal in accordance with the present invention.

Referring now to FIG. 1, there is shown a pictorial diagram illustrating a module box 100 employing a reworkable glass-seal fiber feedthru with a C-seal. Three principle elements are used in hermetically sealing this design: a module box 100 made of aluminum, a ferrule sub-assembly 110, and a C-seal 120. The ferrule sub-assembly 110 comprises a glass-seal 130 and a fiber 140. The ferrule sub-assembly 110 is hermetically sealed by using the glass seal 130 and the C-seal 120 for sealing the opening where the fiber 140 extends into the module box 100. The fiber 140 extends firstly through the glass seal 130, extends secondly through the C-seal 120, and subsequently hermetically seals the module box 100. The ferrule sub-assembly 110 is preferably made of Kovar, or other similar or equivalent materials.

The C-seal 120 is a metal-to-metal seal that is suitable for hermetic sealing. The use of the C-seal 120 allows the ferrule sub-assembly 110 and the fiber 140 to be reworkable when it is necessary to replace with a new one. A clamp 150 is used to clamp down a rubber boot 160 for enhancing hermetically sealing of the fiber 140 into the module box 100. At the entrance of the glass seal 130 by the fiber 140, an epoxy overfillet 170 is placed in front of the glass seal 130. The module box 100 can be made of aluminum or other similar materials that are suitable for hermetic sealing.

Figure 2:
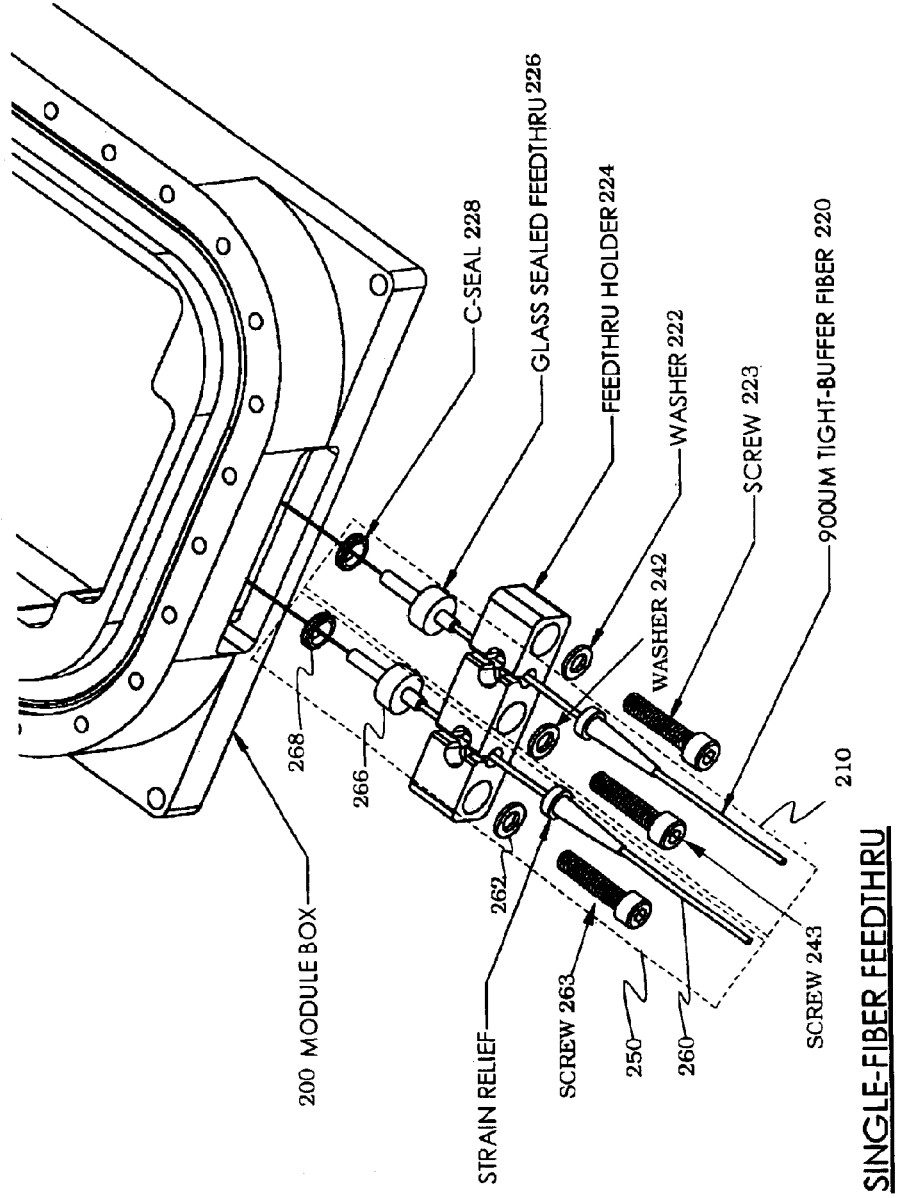
FIG. 2 is a pictorial diagram illustrating a first embodiment of a module box employing a single-fiber feedthru in accordance with the present invention.

Turning now to FIG. 2, there is shown a pictorial diagram illustrating a first embodiment of a module box 200 employing a single-fiber feedthru. In this embodiment, the module box 200 has two entry openings where a first single-fiber feedthru sub-assembly 210 is hermetically sealed into a first opening of the module box 200 and where a second single-fiber feedthru sub-assembly 250 is hermetically sealed into a second opening of the module box 200. One of ordinary skill in the art should recognize that additional single-fiber feedthrus can be added without departing from the spirits of the present invention.

A first fiber 220 passes through a first opening in a feedthru holder 224, a first glass-sealed feedthru 226 and a first C-seal 228 into the first opening of the module box 200. A second fiber 260 passes through a second opening in the feedthru holder 224, a second glass-sealed feedthru 266, and a second C-seal 268 into the second opening of the module box 200. The combination of the first glassed-sealed feedthru 226 pressing through the first C-seal 228 into the first opening of the module box 200 and the second glassed-sealed feedthru 266 pressing through the second C-seal 268 into the second opening of the module box 200 hermetically seals the module box 200. A set of screws 223, 243 and 263 are used, together with a set of split lock washers 222, 242 and 262, respectively for pressing the feedthru holder 224 into the module box 200, thereby mechanically sealing the module box 200. The screw 223 passes through a split lock washer 222, passes through a first opening of the feedthru holder 224, and presses into the module box 200, the screw 243 passes through a split lock washer 242, passes through a second opening of the feedthru holder 224, and presses into the module box 200 and the screw 263 passes through a split lock washer 262, passes through a third opening of the feedthru holder 224, and presses into the module box 200.

Figure 3:
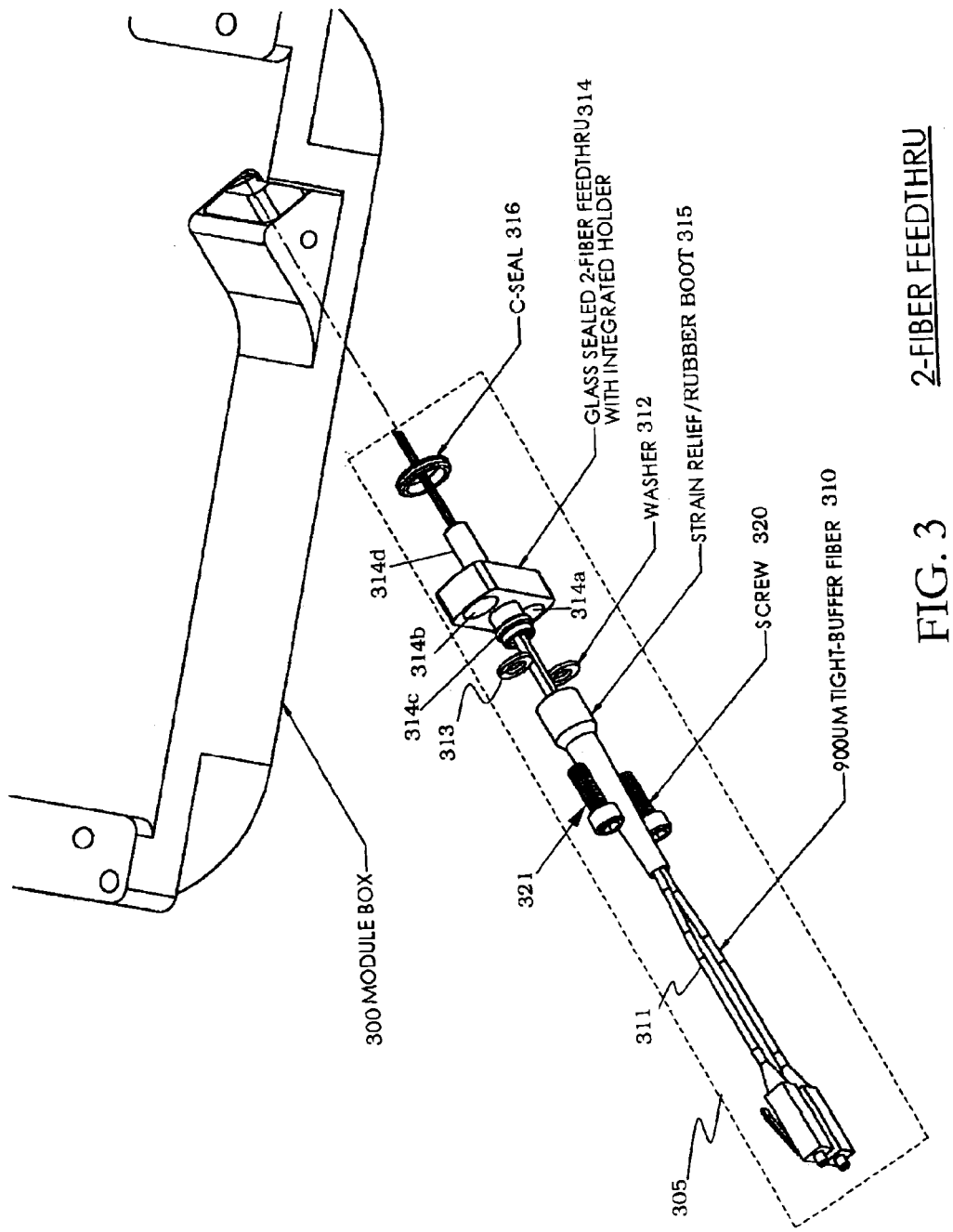
FIG. 3 is a pictorial diagram illustrating a second embodiment of a module box employing a 2-fiber feedthru in accordance with the present invention.

FIG. 3 is a pictorial diagram illustrating a second embodiment of a module box 300 employing a 2-fiber feedthru. Two fibers, a first fiber 310 and a second fiber 311, are used with a set of sub-assembly 305 to hermetically seal the module box 300. The sub-assembly 305 comprises a first fiber 310, a second fiber 311, a glass-sealed 2-fiber feedthru with integrated holder 314, and a C-seal 316, a strain relief or rubber boot 315, a first screw 320, a first split lock washer 312, a second screw 321 and a second split lock washer 313. The first fiber 310 passes through a first opening 314a in the glass-sealed 2-fiber feedthru with integrated holder 314 and passes through the C-seal 316 into a first opening of the module box 300. The second fiber 311 passes through a second opening 314b in the glass-sealed 2-fiber feedthru with integrated holder 314 and the C-seal 316 into a second opening of the module box 300. A pair of screws 320 are used, together with a set of split lock washers 312 and 313, respectively for pressing the glass-sealed 2-fiber feedthru with integrated holder 314 into the module box 300, thereby hermetically seals the module box 300. The screw 320 passes through a split lock washer 312, passes through the glass-sealed 2-fiber feedthru with integrated holder 314 and presses into the module box 300. The screw 321 passes through a split lock washer 313, passes through the glass-sealed 2-fiber feedthru with integrated holder 314 and presses into the module box 300.

The glass-sealed 2-fiber feedthru with integrated holder 314 has a fiber retention tubing 314c at a first end and a glass sealing tubing 314d on a second end. On the first end, the glass-sealed 2-fiber feedthru with integrated holder 314 has the fiber retention tubing 314c for holding the rubber boot 315 in place. On the second end, the glass-sealed 2-fiber feedthru with integrated holder 314 has the glass sealing tubing 314d for avoiding stress from imposing on the glass seal area, such as the area shown in the glass seal 130 in FIG. 1. The glass sealing tubing 314d is preferably designed with some length so that the sealing area nearing the module box 300 is distant away from the stress area nearing the glass-sealed 2-fiber feedthru with integrated holder 314.

Figure 4:
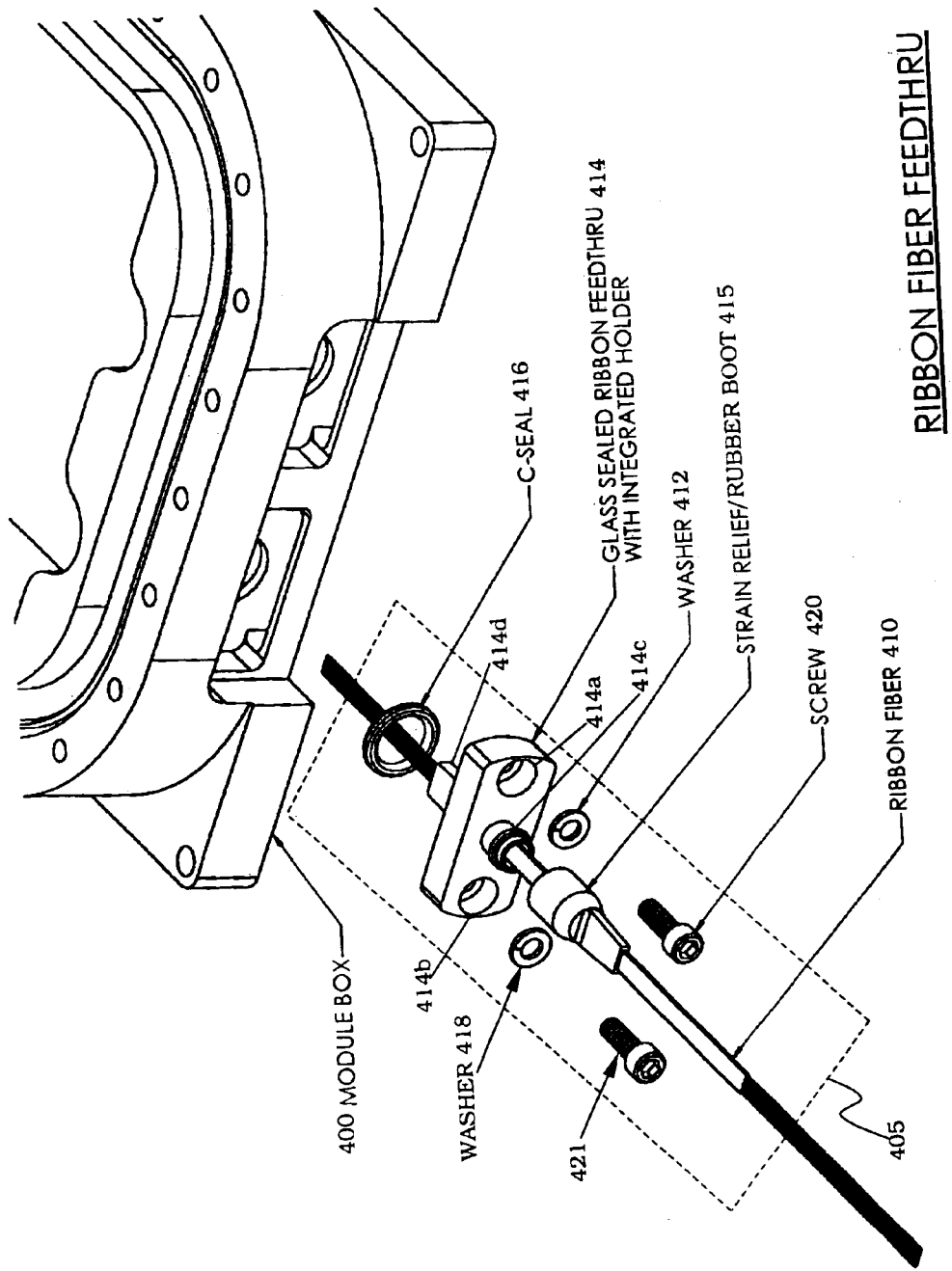
FIG. 4 is a pictorial diagram illustrating a third embodiment of a module box employing a ribbon fiber feedthru in accordance with the present invention.

In FIG. 4, there is shown a pictorial diagram illustrating a third embodiment of a module box 400 employing a ribbon fiber feedthru sub-assembly 405. The ribbon fiber sub-assembly 405 comprises a ribbon fiber 410, a glass-sealed ribbon feedthru with integrated holder 414, a C-seal 416, a strain relief or rubber boot 415, a first screw 420, a first split lock washer 412, a second screw 421 and a second split lock washer 418. The ribbon fiber 410 passes through the glass-sealed ribbon feedthru with integrated holder 414 and the C-seal 416 into the module box 400 for hermetic sealing. A pair of screws 420 and 421 are used, together with a set of split lock washers 412 and 418, respectively for pressing the glass sealed ribbon feedthru with integrated holder 414 into the module box 400, thereby mechanically seals the module box 400. The first screw 420 passes through the first split lock washer 412, passes through a first opening 414a in the glass sealed 2-fiber feedthru with integrated holder 414, and presses into the module box 400, and the second screw 421 passes through the second split lock washer 418, passes through a second opening 414b in the glass sealed 2-fiber feedthru with integrated holder 414, and presses into the module box 400.

The glass-sealed ribbon feedthru with integrated holder 414 has a fiber retention tubing 414c at a first end and a glass sealing tubing 414d on a second end. On the first end, the glass-sealed ribbon feedthru with integrated holder 414 has the fiber retention tubing 414c for holding the rubber boot 415 in place. On the second end, the glass-sealed ribbon feedthru with integrated holder 414 has the glass sealing tubing 414d for avoiding stress from imposing on the glass seal area, such as the area shown in the glass seal 130 in FIG. 1. The glass sealing tubing 414d is preferably designed with some length so that the sealing area near the module box 400 is distant away from the stress area near the glass-sealed ribbon feedthru with integrated holder 414.

Figure 5:
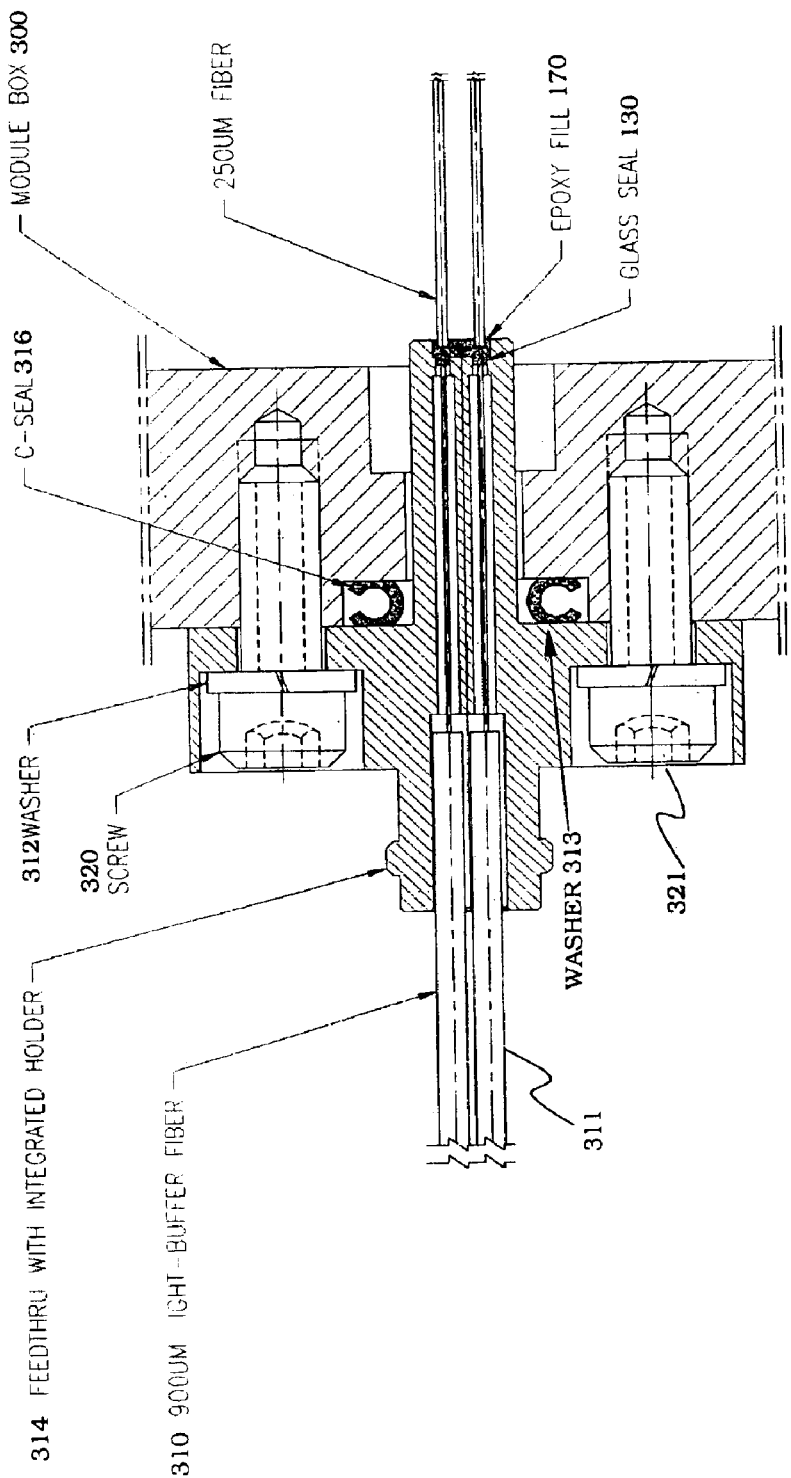
FIG. 5 is a pictorial diagram illustrating a sectional view of the module box employing the 2-fiber feedthru as described with respect to FIG. 3 in accordance with the present invention.

FIG. 5 is a pictorial diagram illustrating a cross-sectional view of the module box 300 employing the 2-fiber feedthru as described with respect to FIG. 3 that shows the glass seal 130 and the epoxy fill 170. The glass sealed 2-fiber feedthru with integrated holder 314 holds the first fiber 310 and the second fiber 311 in place, with the glass seal 130 presses into the module box 300 with the epoxy fill 170 surrounding the entry into the module box 300 and the glass seal 130. The C-seal 316 wraps around the glass sealed 2-fiber feedthru with integrated holder 314. The first screw 320 passes through the first split lock washer 312 and presses the first split lock washer 312 into the module box 300. The second screw 321 passes through the split lock washer 313 and presses the second split lock washer 313 into the module box 300. The split lock washers 312 and 313 are used to maintain the tightness of the screws 320 and 321, preventing the first and second screws 320 and 321 from becoming loose.

With respect to FIGS. 3 and 5 for the 2-fiber feedthru, during the assembly of the feedthru with integrated holder 314, areas surrounding the feedthru 314 and module box 300 that make contacts with the C-seal 316 are wiped and cleaned using alcohol to remove any potential oil residual and contaminants on these sealing surfaces. Screws 320 and 321 are evenly tightened using a torque wrench to avoid any deformation of the feedthru 314. Similar practices are applicable to the single-fiber feedthru embodiment as described with respect to FIG. 2 and the ribbon fiber feedthru embodiment as described with respect to FIG. 4.

The above embodiments are only illustrative of the principles of this invention and are not intended to limit the invention to the particular embodiments described. For example, each of the module boxes described above can be made of aluminum or other similar materials that are suitable for hermetic sealing. Moreover, it is apparent to one of ordinary skill in the art that other types of glass seal designs may be used without departing from the spirit of the present invention. Accordingly, various modifications, adaptations, and combinations of various features of the described embodiments can be practiced without departing from the scope of the invention as set forth in the appended claims.

We claim:

1. A module box having an opening with a single-fiber feedthru, comprising a C-seal;

a glass-sealed feedthru having a front tube and a back tube, the back tube of the glass-sealed feedthru extending through the C-seal; and a fiber passing through the glass-sealed feedthru and the C-seal, thereby hermetically sealing into the opening of the module box made of aluminum.

2. The module box of claim 1, further comprising a feedthru holder coupled to the front tube of the glass sealed feedthru, the fiber extending through the feedthru holder, the glass sealed feedthru, and the C-seal.

3. The module box of claim 2, further comprising a first screw for pressing a first split lock washer and the feedthru holder into the module box.

4. The module box of claim 3, further comprising a second screw for pressing a second split lock washer and the feedthru holder into the module box.

5. A module box having with a 2-fiber feedthru, comprising:

a C-seal;

a glass sealed 2-fiber feedthru with integrated holder having a fiber retention tubing at a front end and a glass sealing tubing at a back end, the glass sealing tubing of the glass sealed 2-fiber feedthru with integrated holder extending through the C-seal;

a first fiber passing through the glass sealed 2-fiber feedthru with integrated holder and the C-seal, thereby hermetically sealed into a first opening of the module box made of aluminum; and a second fiber passing through the glass sealed 2-fiber feedthru with integrated holder and the C-seal, thereby hermetically sealed into a second opening of the module box.

6. The module box of claim 5, further comprising a rubber boot having a first end and a second end wherein the second end of the rubber fits into the fiber retention tubing of the glass-sealed 2-fiber feedthru with integrated holder.

7. The module box of claim 6, wherein the glass sealing tubing fiber of the glass sealed 2-fiber feedthru with integrated holder has a sufficient length to avoid stress from being imposed on a glass seal area in the glass sealed 2-fiber feedthru with integrated holder.

8. The module box of claim 7, further comprising a first screw for pressing a first split lock washer and the glass sealed 2-fiber feedthru with integrated holder into the module box.

9. The module box of claim 8, further comprising further comprising a second screw for pressing a second split lock washer and the glass sealed 2-fiber feedthru with integrated holder into the module box.

10. A module box with ribbon fiber feedthru, comprising:

a C-seal;

a glass sealed ribbon feedthru with integrated holder having a fiber retention tubing at a front end and a glass sealing tubing at a back end, the glass sealing tubing of the glass sealed ribbon feedthru with integrated holder extending through the C-seal; and a ribbon fiber passing through the glass sealed ribbon feedthru with integrated holder and the C-seal, thereby hermetically sealed into an opening of the module box made of aluminum.

11. The module box of claim 10, further comprising a rubber boot having a first end and a second end wherein the second end of the rubber fits into the fiber retention tubing of the glass-sealed ribbon feedthru with integrated holder.

12. The module box of claim 11, wherein the glass sealing tubing fiber of the glass sealed ribbon feedthru with integrated holder has a sufficient length to avoid stress from being imposed on a glass seal area in the glass sealed ribbon feedthru with integrated holder.

13. The module box of claim 12, further comprising a first screw for pressing a first split lock washer and the glass sealed ribbon feedthru with integrated holder into the module box.

14. The module box of claim 13, further comprising a second screw for pressing a second split lock washer and the glass sealed ribbon feedthru with integrated holder into the module box.

* * * * *